US011047287B2

(12) United States Patent
Sterlepper et al.

(10) Patent No.: US 11,047,287 B2
(45) Date of Patent: Jun. 29, 2021

(54) TESTING FACILITY FOR AGEING EXHAUST GAS SYSTEMS

(71) Applicant: FEV Europe GmbH, Aachen (DE)

(72) Inventors: Stefan Sterlepper, Eschweiler (DE); Jimmy Cox, Kerkrade (NL)

(73) Assignee: FEV Europe GmbH, Aaachen (DE)

( * ) Notice: Subject to any disclaimer, the term of this patent is extended or adjusted under 35 U.S.C. 154(b) by 95 days.

(21) Appl. No.: 16/261,805

(22) Filed: Jan. 30, 2019

(65) Prior Publication Data
US 2019/0234279 A1    Aug. 1, 2019

(30) Foreign Application Priority Data

Jan. 31, 2018   (DE) .......................... 102018102104.6

(51) Int. Cl.
| | |
|---|---|
| *F01N 11/00* | (2006.01) |
| *F01N 9/00* | (2006.01) |
| *G01M 99/00* | (2011.01) |
| *G01M 15/10* | (2006.01) |
| *F01N 3/025* | (2006.01) |
| *F01N 3/021* | (2006.01) |
| *F01N 3/20* | (2006.01) |
| *F02M 26/15* | (2016.01) |
| *F01N 13/00* | (2010.01) |

(52) U.S. Cl.
CPC .............. *F01N 11/00* (2013.01); *F01N 3/021* (2013.01); *F01N 3/025* (2013.01); *F01N 3/2033* (2013.01); *F01N 9/00* (2013.01); *F01N 13/009* (2014.06); *F02M 26/15* (2016.02); *G01M 15/10* (2013.01); *G01M 15/102* (2013.01); *G01M 99/00* (2013.01); *F01N 2240/14* (2013.01); *F01N 2550/02* (2013.01); *Y02T 10/12* (2013.01)

(58) Field of Classification Search
CPC .......... F01N 11/00; F01N 3/101; F01N 3/035; F01N 2550/02; F01N 2550/04; F01N 2550/20; G01M 15/102; G01M 15/04; Y02T 10/12; Y02T 10/40
See application file for complete search history.

(56) References Cited

U.S. PATENT DOCUMENTS

| | | | |
|---|---|---|---|
| 6,983,645 B2 * | 1/2006 | Webb ..................... | F23D 11/104 73/118.01 |
| 7,131,320 B2 * | 11/2006 | Weinowski ............. | F01N 11/00 73/114.75 |
| 7,140,874 B2 * | 11/2006 | Ingalls, Jr. ............ | F01N 3/2033 431/185 |
| 7,175,422 B2 * | 2/2007 | Webb ..................... | F01N 3/2033 431/2 |

(Continued)

FOREIGN PATENT DOCUMENTS

| | | |
|---|---|---|
| DE | 102004061400 A1 | 7/2006 |
| DE | 102008059224 A1 | 6/2009 |

(Continued)

OTHER PUBLICATIONS

German Search Report dated Oct. 15, 2018.

*Primary Examiner* — Freddie Kirkland, III
(74) *Attorney, Agent, or Firm* — Dinsmore & Shohl LLP

(57) ABSTRACT

Testing facility for ageing exhaust gas systems, with a burner (5), a receiving area for receiving at least one catalytic converter (15) and/or a particulate filter (20). An ash-forming component is supplied here to the burner flame.

9 Claims, 2 Drawing Sheets

(56) References Cited

U.S. PATENT DOCUMENTS

| | | | | |
|---|---|---|---|---|
| 7,212,926 | B2* | 5/2007 | Ingalls, Jr. | F01N 11/00 702/34 |
| 7,277,801 | B2* | 10/2007 | Webb | F01N 3/2033 702/34 |
| 7,347,086 | B2* | 3/2008 | Webb | F23D 11/107 73/29.01 |
| 7,625,201 | B2* | 12/2009 | Ingalls, Jr. | F23D 11/103 431/18 |
| 7,741,127 | B2* | 6/2010 | Johnston Bartley | F01N 3/021 436/181 |
| 7,975,538 | B2* | 7/2011 | In | G01M 15/102 73/114.75 |
| 8,495,908 | B2* | 7/2013 | Nagy | G01M 15/02 73/114.13 |
| 8,679,852 | B2* | 3/2014 | Webb | G01N 1/28 436/160 |
| 2004/0007056 | A1* | 1/2004 | Webb | F23C 7/004 73/114.77 |
| 2004/0025580 | A1* | 2/2004 | Webb | F01N 11/00 73/118.01 |
| 2004/0028588 | A1* | 2/2004 | Webb | F01N 3/025 423/213.2 |
| 2005/0039524 | A1* | 2/2005 | Ingalls, Jr. | F01N 11/00 73/114.77 |
| 2006/0201239 | A1* | 9/2006 | Webb | F23D 11/103 73/114.75 |
| 2009/0151336 | A1* | 6/2009 | In | G01M 15/102 60/289 |
| 2011/0183274 | A1* | 7/2011 | Bahn | F01N 3/2033 431/2 |
| 2019/0178143 | A1* | 6/2019 | Sterlepper | F01N 3/101 |
| 2019/0234279 | A1* | 8/2019 | Sterlepper | G01M 15/102 |

FOREIGN PATENT DOCUMENTS

| | | |
|---|---|---|
| DE | 112008001335 B4 | 10/2016 |
| WO | 2010022747 A1 | 3/2010 |

* cited by examiner

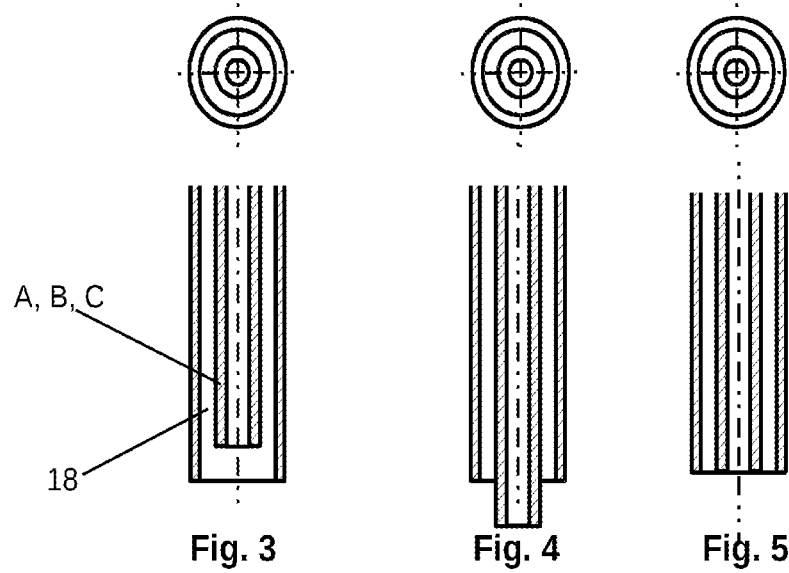
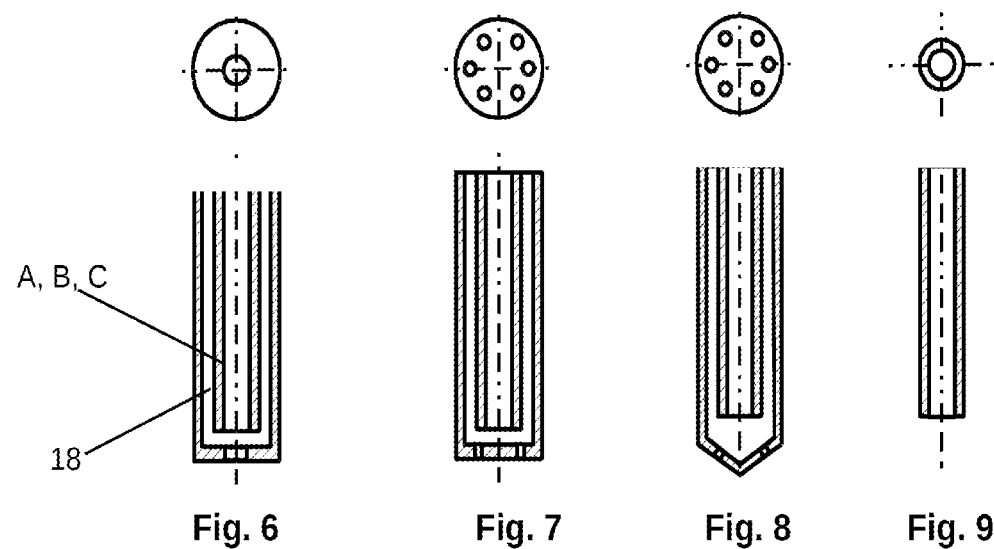
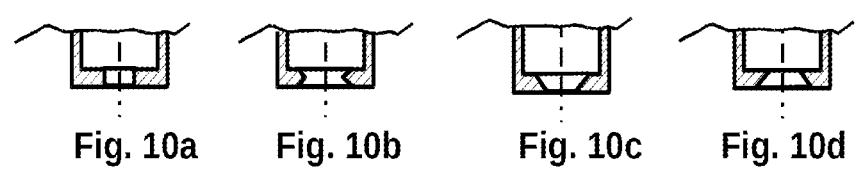

TESTING FACILITY FOR AGEING EXHAUST GAS SYSTEMS

CROSS-REFERENCE TO RELATED APPLICATIONS

This Application claims priority from Application 102018102104.6 filed on Jan. 31, 2018 in Germany.

FIELD OF THE INVENTION

The present invention relates to a testing facility for ageing exhaust gas systems and to a method for operating testing facilities.

BACKGROUND OF THE INVENTION

In the development of exhaust gas trains for motor vehicles it is an important task to test the exhaust gas trains in order, with the testing facility, to simulate a desired service life of the exhaust gas train over a shortened test period and in order to thus obtain measured values which have a real significance in relation to the actual service life of the exhaust gas train. At the moment, great weight is placed on the simulation of the service life of particulate filters. From WO2010022747A1 a testing unit is known FOR the ageing of catalytic converters.

SUMMARY OF THE INVENTION

A testing facility for the ageing of exhaust gas systems comprises a burner, a receiving area for receiving at least one catalytic converter and/or a particulate filter, wherein the burner comprises a fuel inflow and a charge air inflow. The testing facility moreover comprises an ash-forming component inflow, which is separate from the fuel inflow, with which an ash-forming component can be oxidized by means of the burner flame. The testing facility comprises in particular an exhaust gas recirculation. The inflow of the ash-forming component can be controlled and/or regulated independently of the fuel inflow. A burner is in particular a device for generating a continuous combustion. Portions of ash-forming components can hereby be produced deliberately in the exhaust gas stream of the burner in order to simulate in a reproducible manner a defined accelerated ageing of parts of the exhaust gas system, in particular a particulate filter (both for diesel and also petrol).

In particular the burner is surrounded at least in some portions by an insulation, and the ash-forming component inflow is guided through the insulation, and a coolant inflow is arranged surrounding the ash-forming component inflow at least in some portions. In particular the coolant inflow can be arranged coaxially around the ash-forming component inflow. The burner can also be designed in some applications without any insulation. Insulation is expedient in order to reduce the heat dissipation from the burner and in order to thus obtain a defined high exhaust gas temperature and reduce the fuel consumption. When the ash-forming component is fed into the burner flame, the feed pipe of the ash-forming component is consequently exposed in part inside the insulation and thus to continuously high burner temperatures, which can lead to the ash-forming component oxidizing or degenerating, such as for example turning to ash, already inside its feed pipe. In order to prevent this, it was found that cooling this feed pipe was helpful and/or necessary. The coolant can be directed, by way of example, into the exhaust gas stream of the burner. Alternatively, it can be diverted again from the burner in a (closed) circuit.

It is furthermore advantageous if the ash-forming component inflow has a pipe portion with an internal diameter of less than 2.0 mm and in particular less than 1.0 mm. The diameter can more typically be about 0.6 mm. These specifications mean that the diameter is extremely small. This small diameter can be constant over the entire length with which the ash-forming component inflow is guided inside the insulation. The small diameter can extend over a length of at least 10 mm. This small cross-section prevents a large dead volume from forming inside the ash-forming component inflow. Also, with a predetermined amount of ash-forming component required, the flow speed is relatively high which reduces the danger of thermal ageing of the ash-forming component in its pipeline. The geometry of the internal diameter (as circular) is not relevant, but a different geometry can equally be used.

In particular the ash-forming component inflow can comprise an outlet nozzle whose active outlet cross-section is smaller than the internal diameter of the ash-forming component inflow. This outlet opening is local and thus differs from the internal diameter previously mentioned which can extend unchanged over a certain length. The nozzle thus described increases the flow speed which leads to the formation of a spray mist.

In a first alternative, the ash-forming component inflow can be arranged in front of the flame in the fluid direction. This is advantageous since the ash-forming component inflow itself (thus the pipe guide) is not exposed to the high combustion temperatures. In a second alternative, the ash-forming component inflow is arranged in the region of the flame. This is advantageous since the best possible incineration of the ash-forming component becomes possible. And in a third alternative, the ash-forming component inflow can be arranged after the flame in the fluid direction. The flame mentioned in these embodiments is the flame which is fed with the first combustion fuel and this is the main source of energy. The quantity of the ash-forming component is preferably less than 10% of the quantity of the fuel of the fuel supply for the flame.

In a process for artificially ageing exhaust gas systems, a fuel is supplied to produce a flame in a burner, and an ash-forming component is supplied in a separate supply, and the exhaust gas stream of the burner is directed into the exhaust gas system in order in this way to generate ageing of the exhaust gas system or at least a part thereof.

Ageing of a particulate filter, in particular for a specific engine, can be simulated in that the ash-forming component corresponds to the engine oil of this engine, and the quantity of ash-forming component used in the simulation process corresponds to the overall consumption of the engine oil of the engine over a simulation period which is to be simulated, and an evaluation is carried out under the assumption that the state of the particulate filter after the simulation process corresponds to the state of a particulate filter used in the engine after this simulation period. This is possible in the knowledge that the incineration of the particulate filter is caused in sizeable parts by the engine oil.

In particular, a control regulates the combustion of the burner dependent on measured values, such as in particular the measured value of a lambda probe and/or the fuel-air ratio, so that the combustion values are in a target range or correspond to a target value.

It is further advantageous if, in addition to a charge air inflow, which is required to feed the flame, a second inflow is provided for a gaseous fluid, and the ratio of the ash-forming component with a fluid supplied via the second inflow is set so that the fuel-air ratio of the burner combustion remains substantially unchanged. In other words: the ratio of ash-forming component to the fluid of the second inflow can be, with regard to the lambda value, identical to the ratio of the fuel inflow and charge air of the burner combustion.

The second inflow can be controlled or regulated differently in relation to the fuel and charge air inflow respectively:

Option 1: Just enough air, so that $\lambda_{Ash\text{-}forming\ component} = \lambda_{fuel}$, i.e. oil plus second medium produce the same air ratio as fuel and charge air to target lambda regulation, so that lambda-neutral operation of the oil injection is achieved.

Option 2: The amount of air is determined according to the cooling requirement of the inner small pipe, thus of the second inflow. The lambda regulation is then carried out via adaption of the charge air of the main combustion.

Option 3: Exhaust gas recirculation (EGR) for cooling. The required oxygen is provided via the charge air. The EGR has the same lambda as the entire combustion exhaust gas and the cooling amount can thus be adjusted independently of lambda.

Option 4: Analogous with Option 2, but the amount of air is set so that a desired vaporization of the ash-forming component is achieved.

Option 5: Analogous with Option 3, but EGR amount is set so that a desired vaporization is achieved.

A broad invariability of this value is assumed, in particular with a deviation of +/−20% and preferably a max. +/−10% of the lambda value. The second inflow is, in particular, a separate inflow system. This can be formed by exhaust gas and/or fresh air and/or a mixture of these or other gases. Thus, regulation is simplified to the extent that, for regulating the burner combustion, the control values do not have to be adapted, or only little adapted, in the event of a change of the inflow of ash-forming component, which increases the significance of the measured values. When using exhaust gas recirculation, the recirculated exhaust gas already has the desired lambda value. This can be 1 in particular in the case of Otto-cycle engine applications. A region of 1+/−10% is advantageous here. For diesel systems (inter alia DPF), a $\lambda > 1$ is preferably selected according to the vehicle operation (by way of example between 1.2 and 2).

It is further advantageous if, during a measuring cycle of the ageing of a particulate filter, an ash-forming component is supplied via an ash-forming component inflow, and to terminate the measuring cycle the ash-forming component inflow is flushed with a medium which does not have a tendency to become ash. This medium can be, by way of example, a simple alcohol which can release ash-forming components deposited on the walls of the inflow and lead them to combustion, or a gas, such as for example ambient air or exhaust gas. In each case it is advantageous if the ash-forming component is removed from the ash-forming component inflow, such as by way of example is blown out, since after terminating the measuring cycle the temperature of the burner is still extremely high for a longer time, and the ash-forming component could still turn to ash in its inflow.

DESCRIPTION OF THE DRAWINGS

The invention will now be explained below by way of example with reference to preferred embodiments. In the drawings:

FIG. 3 to FIG. 9 show different forms of nozzles for introducing an ash-forming component, and FIGS. 10a to 10d show different geometries of the nozzle outlet.

DETAILED DESCRIPTION OF THE PREFERRED EMBODIMENTS

Figure 1:
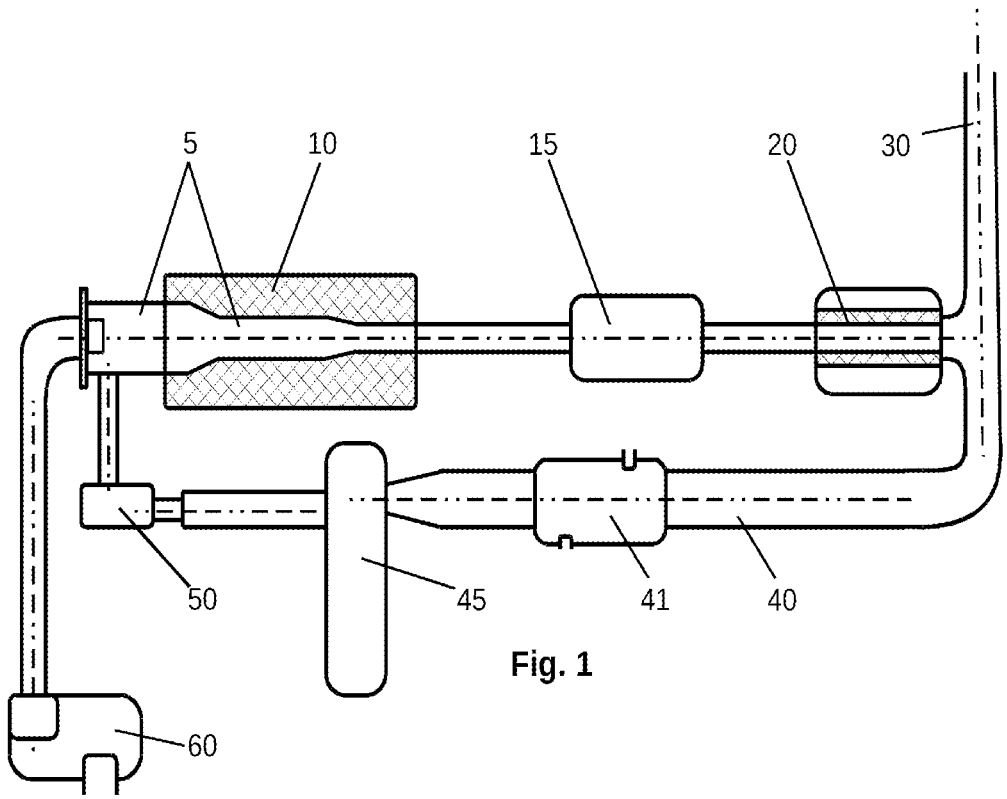
FIG. 1 shows a diagrammatic illustration of a testing facility for testing an exhaust gas system.

The diagrammatic illustration of FIG. 1 shows a testing facility with a burner 5 which is provided with a thermal insulation 10 in some portions. The exhaust gases are directed from the flame 12 of the burner 5 into an optional catalytic converter 15, and from there to a particulate filter 20. After the particulate filter the exhaust gas stream is divided up and one part is diverted away into the atmosphere via an exhaust gas outlet 30. A proportion of the exhaust gas stream is however supplied back into an exhaust gas recirculation line 40 for combustion. The exhaust gas stream is to this end directed through an (optional) heat exchanger 41 and an (optional) condensation absorber 45 and an optional compressor 50, and from there into the combustion chamber of the burner 5. The charge air is supplied for combustion via a charge air inflow 60, and a fuel is supplied through a fuel inflow (not shown). The flame 12 is fed essentially through the combustion of the fuel with the (oxygen-containing) combustion gas, and then kept burning. The charge air inflow 60 can comprise a charge air compressor and/or a charge air cooler. The detail of the burner is shown on an enlarged scale in FIG. 2. A fuel injector (not shown) is seated at the same level centrally in the mixer. Mixing the charge air and the fuel is then carried out (in the flow direction). The (optional) stream of the exhaust gas recirculation 40 can be supplied already during this mixing or independently thereof. The combustible mixture formed in this way is ignited by an ignition (not shown) so that the illustrated flame 12 is formed.

The testing facility is operated so that it lies as close as possible to typical driving conditions. Thus, the fuel (e.g. diesel or petrol, super . . . ) is preferably used as combustible fuel which is also used in the case of the engine which is to be simulated. It is preferred (in the case of an Otto-cycle engine simulation) to use a combustion air ratio A of 1, since here complete combustion takes place. It was found that ash deposits, which are collected or separated off in the particulate filter, arise for the most part from engine oil which is oxidized at least partly in the event of engine combustion, and ash is correspondingly formed. In order to obtain a measured result which is as close as possible to the actual conditions of use, the engine oil which is used in the engine is preferably also used as the ash-forming component. Purely theoretically and obvious to a person skilled in the art, the ash-forming component could be added by way of example to the fuel of the flame 12 of the burner, or a substance which has a high proportion of ash could be used as fuel. It was, however, recognized as an important part of the present invention that this procedure can be disadvantageous since then the ash-forming component would be atomized conjointly and very finely with the fuel. Very fine ash particles would then be correspondingly obtained which on the one hand are not formed in the way as happens with an actual engine operation. It was furthermore found that these ash deposits are very sticky which likewise deviates from the actual engine conditions.

Figure 2:
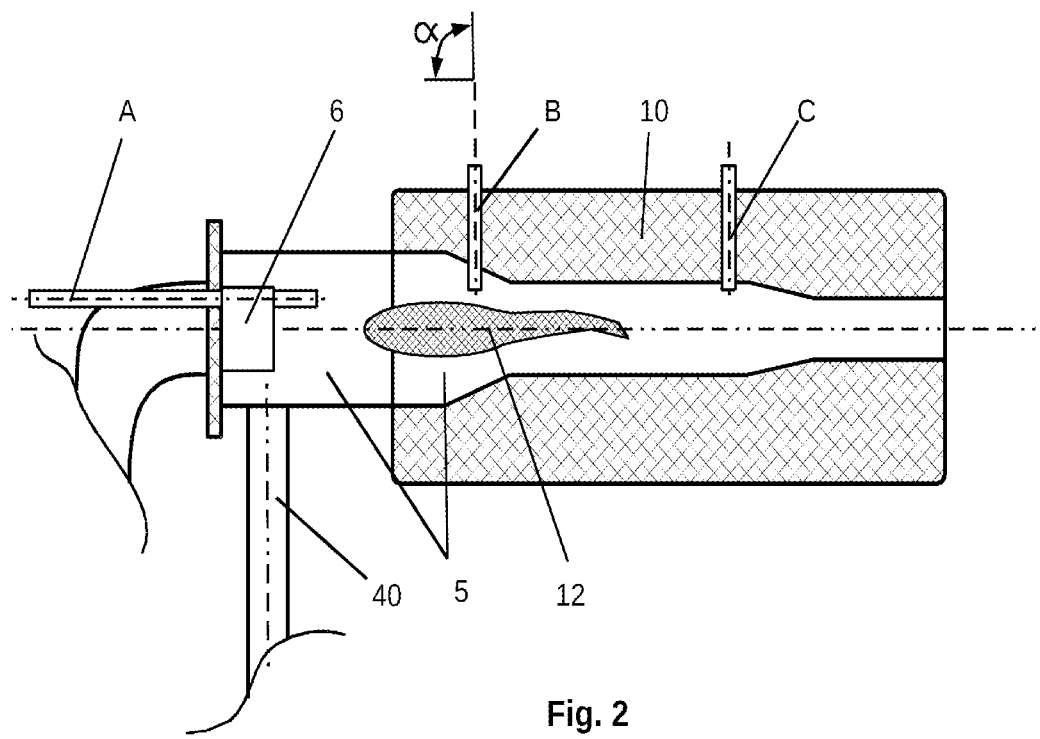
FIG. 2 shows the detail of a burner of the testing facility shown in FIG. 1.

Preferably, no ash-forming component is added to the fuel. Instead of this, three ash-forming component inflows A, B and C are shown in FIG. 2. These ash-forming component inflows are preferably an alternative, so that depending on the embodiment, in particular only one ash-forming component inflow A, B or C is used. In the simplest case, the ash-forming component inflow A, B or C comprises only a small pipe through which the ash-forming component is injected into the burner 5. There are in principle three places for injection, namely in front of the flame (Example A), directly into the flame (Example B) and after the flame (Example C).

Example A can be advantageous since the ash-forming component is injected into the cold region of the burner 5 and thus the danger of carbonization in the ash-forming component inflow itself, such as for example through deposits on the inside wall or nozzle thereof, is minimized. The example B, supply inflow into the flame, can be preferred since the ash-forming component is oxidized immediately and substantially completely and converted into ash with great reliability. Equally, injection can take place after the flame 12 (see Example C) since it is here again somewhat cooler. Where applicable, an additional after-burn can be required.

FIGS. 3 to 9 show different nozzles wherein the corresponding nozzle is shown in a view from below in the upper part of each figure. FIG. 9 shows the simplest case already mentioned where the ash-forming component inflow is designed only as a pipe with an open blunt end. This design is particularly suitable at position A since here no high temperatures prevail through which the ash-forming component could be aged or carbonized inside its inflow. On the other hand, the other embodiments have a coaxial structure, with two pipes lying one inside the other. The inner element serves as the channel for the ash-forming component. And a channel of a second inflow 18, which in turn is demarcated by an outer pipe, surrounds the outside of the inner element. A fluid can be conveyed in this second inflow 18 into the combustion chamber. Charge air supplied from the surroundings of the engine, or exhaust gas of an exhaust gas recirculation, or a mixture thereof, is suitable for this purpose. If a continuous fluid stream is passed in the second inflow 18 then this fluid stream prevents (or at least restricts) the heating of the inner ash-forming component inflow A, B or C. A degeneration of the ash-forming component is thereby prevented or at least reduced. With the variation of FIG. 3, the ash-forming component inflow is off-set in order to produce a space from the flame 12. In FIG. 4 the ash-forming component inflow protrudes in order to be able to inject as directly as possible into the flame, and in FIG. 5 both said pipe portions end flush, which is advantageous in order to enable extensive protection of the ash-forming component inflow. In FIGS. 6 to 8 the ash-forming inflow A, B, C each lies in an enclosure which is closed radially peripherally and has on the nozzle output side (at the bottom in the figures) at least one opening each whose cross-sectional surfaces are cumulatively smaller than the internal cross-section of the ash-forming component inflow A, B, C. Through this reduced surface the through-flow is accelerated and a certain vaporization correspondingly takes place. Thus in FIG. 6 a single coaxial bore is used and in FIGS. 7 and 8 there are 6 (preferably at least 3) bores used which are radially off-set and peripherally spread out. The form of these bores can be different. They can be cylindrical, as in FIG. 10a, with a sharp or pointed peripheral edge according to FIG. 10b, or with a tapering or expanding cross-section (FIGS. 10c and 10d).

In other alternative embodiments the second inflow 18 need not be coaxial with the ash-forming component inflow A, B or C, but can be configured separately therefrom. The amount of the mass stream supplied through the second inflow 18 can be determined so that the combustion air ratio $\lambda$ is not changed despite the supply of ash-forming component.

The angle of the ash-forming component inflow B and C (FIG. 2) is radial, thus at an angle $\alpha$ of 90°+/−20°. In some embodiments it can be in the range from 20 to 70°, in order for the ash-forming component to have a proportion of movement in the flame direction. Alternatively, the angle $\alpha$ can lie in the region of 110° to 160° in order to thus obtain a good vortex counter to the flame direction.

The invention claimed is:

1. A testing facility for ageing exhaust gas systems, comprising a burner having a flame, a receiving area for receiving at least one catalytic converter and/or a particulate filter, wherein the burner has a fuel inflow and a charge air inflow, the burner also having an ash-forming component inflow, which is separate from the fuel inflow, with which an ash-forming component can be oxidized in the burner;
wherein the separate ash-forming component inflow is supplied in at least one location selected from in front of the flame, directly into the flame and after the flame.

2. The testing facility according to claim 1, wherein at least some portions of the burner are surrounded by an insulation and the ash-forming component inflow is guided through the insulation, and a coolant inflow is arranged to surround at least some portions of the ash forming component inflow.

3. The testing facility according to claim 1, wherein the ash-forming component inflow has a pipe portion with an internal diameter of less than 2.0 mm.

4. The testing facility according to claim 1, wherein the ash-forming component inflow comprises an outlet nozzle having an active outlet cross-section smaller than a sum of a flow cross-sectional surface of the ash-forming component inflow and, where present, of a flow cross-sectional surface of a coolant inflow.

5. A method for artificially ageing exhaust gas systems comprising supplying a fuel for producing a flame of a burner, and supplying an ash-forming component supplied in a separate inflow, and directing an exhaust gas stream of the burner into an exhaust gas system in order to generate ageing of the exhaust gas system or at least a part thereof;
wherein the separate ash-forming component inflow is supplied in at least one location selected from in front of the flame, directly into the flame and after the flame.

6. The method according to claim 5, for an engine wherein the ageing of a particulate filter is simulated in that the ash-forming component corresponds to the engine oil of the engine, and an amount of ash-forming component used in a simulation process corresponds to an overall consumption of the engine oil of the engine over a simulation time, and evaluating the state of the particulate filter after the simulation process corresponding to the state of a particulate filter used in the engine after the simulation time.

7. The method according to claim 5, wherein regulating a fuel-air ratio of the combustion of the flame of the burner with a control dependent on measured values, such as a measured value of a lambda probe, so that the combustion values are in a target range or correspond to a target value, and wherein the regulation is set up so that the control value does not change when a second fuel is supplied.

8. The method according to claim 5, wherein providing second air flow in addition to a charge air inflow for feeding the flame, the second inflow is provided for a gaseous fluid, and the ash-forming component to a fluid supplied through the second inflow is adjusted so that the fuel-air ratio of the burner combustion remains substantially unchanged and recirculating an exhaust gas or determining gaseous fluid necessary for a cooling requirement of the ash-forming component, and regulating the lambda by adapting the charge air of a main combustion or providing the oxygen required for the oxidation of the ash-forming component via the charge air, and a medium of the second inflow is inert.

9. The method according to claim 5, wherein supplying an ash-forming component via an ash-forming component inflow during a measuring cycle of the ageing of a particulate filter, and terminating a measuring cycle the ash-forming component inflow by flushing with a medium which does not have a tendency to become ash.

* * * * *